(12) United States Patent
Mangelsen et al.

(10) Patent No.: US 6,450,490 B1
(45) Date of Patent: Sep. 17, 2002

(54) QUICK CHANGE TOOLING FOR ROBOTIC WORK STATION

(75) Inventors: Jan C. Mangelsen, Charlotte; John W. Brewer, Davenport; Michael P. Skahill, Pleasant Valley, all of IA (US)

(73) Assignee: Genesis Systems Group, Ltd., Davenport, IA (US)

( * ) Notice: Subject to any disclaimer, the term of this patent is extended or adjusted under 35 U.S.C. 154(b) by 16 days.

(21) Appl. No.: 09/785,651

(22) Filed: Feb. 16, 2001

(51) Int. Cl.[7] .................................................. B25B 1/20
(52) U.S. Cl. .............................. 269/43; 269/71; 269/61; 269/296
(58) Field of Search ............................. 269/71, 75, 58, 269/60, 61, 296, 43; 414/680; 82/129, 286 A; 409/165, 168, 219, 224, 221

(56) References Cited

U.S. PATENT DOCUMENTS

| | | | |
|---|---|---|---|
| 1,834,294 A | * 12/1931 | Spahn | 269/71 |
| 4,416,570 A | * 11/1983 | Argenbright | 269/71 |
| 4,599,034 A | * 7/1986 | Kennedy et al. | 269/71 |
| 4,641,820 A | 2/1987 | Gold et al. | |
| 4,713,873 A | 12/1987 | Gold et al. | |
| 5,873,569 A | * 2/1999 | Boyd et al. | 269/71 |
| 6,347,733 B1 | * 2/2002 | Hickey, II | 269/71 |
| 6,375,178 B1 | * 4/2002 | Schilb et al. | 269/71 |

* cited by examiner

Primary Examiner—Robert C. Watson
(74) Attorney, Agent, or Firm—McKee, Voorhees & Sease, P.L.C.

(57) ABSTRACT

A quick change fixture mounting arrangement includes a pair of mating ball-and-socket connectors at the headstock end of the fixture and a ball joint coupler at the tailstock end of the fixture. This arrangement allows for some misalignment of the fixture relative to the axis of rotation and permits the fixture to be rotated about a second, external axis of rotation.

17 Claims, 6 Drawing Sheets

QUICK CHANGE TOOLING FOR ROBOTIC WORK STATION

BACKGROUND OF THE INVENTION

The present invention relates to interchangeable fixture systems for work stations. More particularly, this invention relates to a quickly changeable fixture for a robotic welding work station. The quick change tooling fixture of this invention is rotatably supported and constrained such that it can be rotated about a second, external axis in addition to its primary axis of rotation.

Robotic welding stations are known and are becoming commonplace in modern factories. Various weld fixture mounting methods have been used. For example, the U.S. Pat. No. 4,713,873 of Gold et al., discloses the fastenerless connection of a fixture to a rotatable headstock positioner and a tailstock positioner. However, this mounting method has a couple of shortcomings. The connection at the headstock positioner has one ball-and-socket connector along the axis of rotation for support and a second ball-and- socket connector radially offset therefrom for radial timing. Thus, the radial clearance required to accommodate the rotation of the fixture is fairly substantial. Also, the other end of the fixture is merely cradled from underneath by a supporting structure on the tailstock. This arrangement relies on gravity to keep the tailstock end of the fixture in the cradle. Consequently, the fixture cannot be rotated about a second, external axis with this arrangement. There is a need for an improved means and method of fixturing workpieces, especially in robotic welding applications.

Therefore a primary objective of the present invention is the provision of an improved quick change tooling arrangement for a robotic work station.

Another objective of this invention is the provision of a fixture mounting arrangement that permits rotation about both a primary axis and a second, external axis.

Another objective of this invention is the provision of a fixture mounting arrangement that is tolerant of some minor misalignment of the fixture in at least two directions perpendicular to the axis of rotation so as to increase bearing life in the drive motor that rotates the fixture.

Another objective of this invention is the provision of a fixture mounting arrangement that is economical to produce, reduces setup times by allowing for quick changes of fixtures, and is accurate, durable and reliable in use.

These and other objectives will be apparent from the drawings, as well as from the description and claims that follow.

SUMMARY OF THE INVENTION

The present invention relates to means for rotatably mounting a quickly interchangeable fixture or fixture subframe between the headstock and tailstock positioners in a robotic work station. Ball-and-socket means connect and radially time a first end of the fixture to the rotary drive mechanism. The second end of the fixture is releasably and rotatably supported on the tailstock positioner by a ball joint coupler.

DETAILED DESCRIPTION OF THE PREFERRED EMBODIMENT(S)

Figure 5:
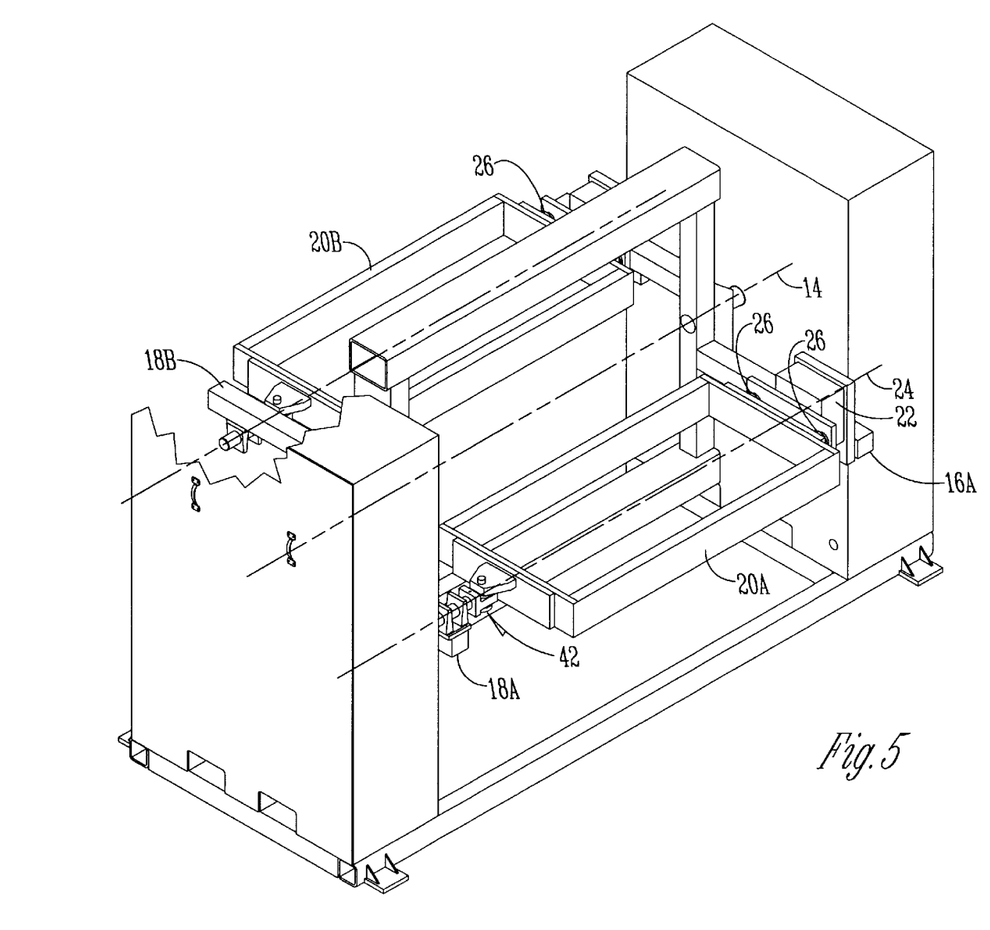
FIG. 5 is a perspective view of a Ferris wheel style robotic welding work station equipped with the fixture mounting arrangement of this invention.

A Ferris wheel style robotic welding work station 10 equipped with the quick change tooling of this invention is shown in FIG. 5. A robot (not shown) capable of automated operations such as welding and the like can be disposed on one side of the work station, for example in the background of FIG. 5. The operator has access to the other side of the work station, for example in the foreground of FIG. 5. A rotary positioning device supports a main framework 12 and rotates it about a central longitudinal axis 14. Various conventional rotary positioning devices will suffice and the rotary positioning device itself is not the subject of this invention.

The main framework 12 has opposing sides each including a pair of headstock and tailstock positioner arms 16A, 16B, 18A, 18B extending therefrom as shown. The headstock and tailstock positioner arms 16A, 16B, 18A, 18B rotatably support a pair of subframes 20A, 20B. One subframe resides on each side of the main framework. One or more fixtures (not shown) mount on each of the subframes to positively locate and hold the work pieces to be welded. One subframe 20A is initially on the operator's side of the work station, which allows the operator to remove the welded work pieces and load onto the fixture the work pieces to be welded. Meanwhile, on the robot's side of the work station, the robot welds the previously loaded work pieces found on the fixture of the second subframe 20B. When the robot completes its welding operations on the parts on the second subframe 20B, the positioning device rotates the main framework 12 so that the first subframe 20A, fixture, and work pieces thereon are presented to the robot and the second subframe 20B, fixture, and work pieces thereon are presented to the operator for unloading and loading.

The subframes 20A, 20B are preferably identical. The drawings and the description below focus on the novel mounting arrangement with respect to subframe 20A. However, the mounting arrangement for subframe 20B is structurally the same.

Figure 1:
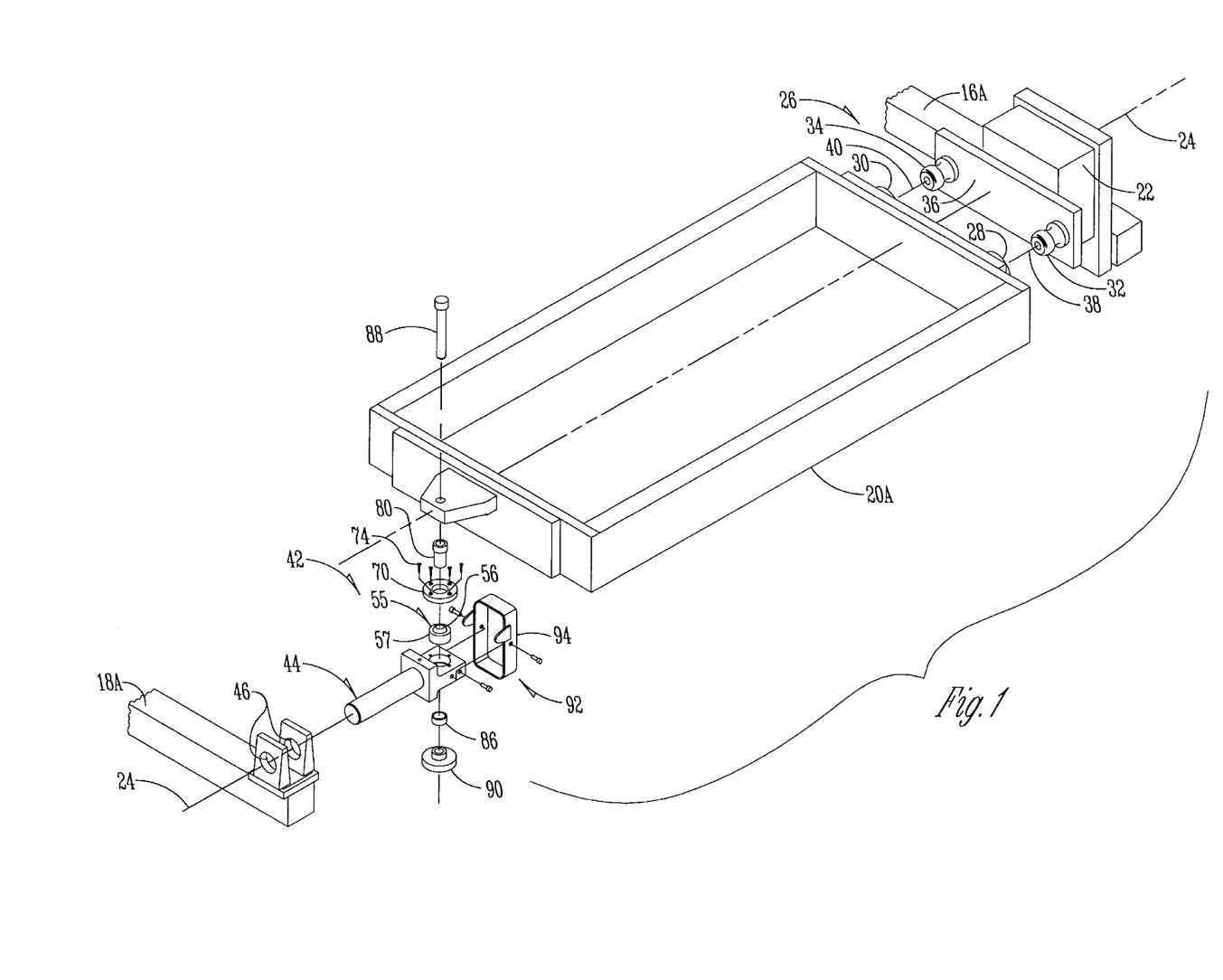
FIG. 1 is an exploded assembly view showing the fixture mounting arrangement of this invention.
Figure 2:
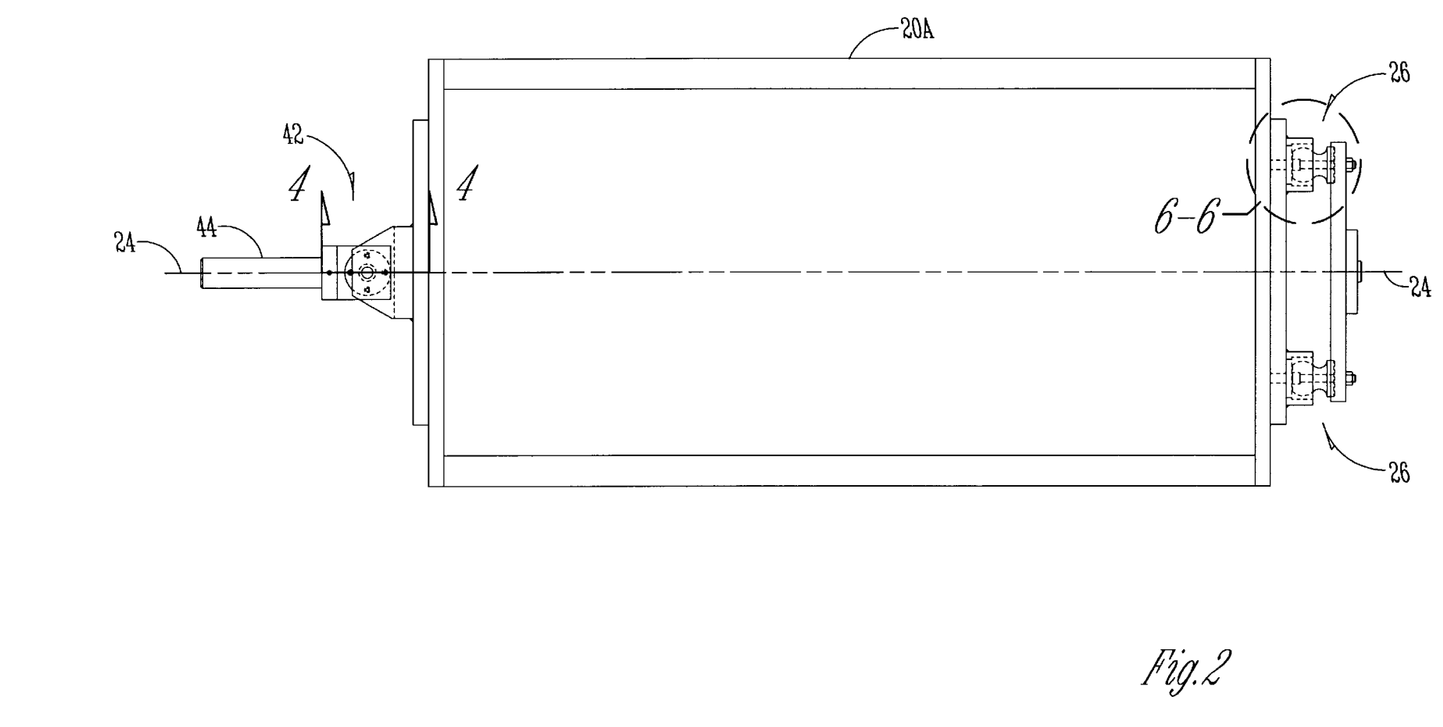
FIG. 2 is a top plan view of some of the components of the fixture mounting arrangement of FIG. 1.
Figure 3:
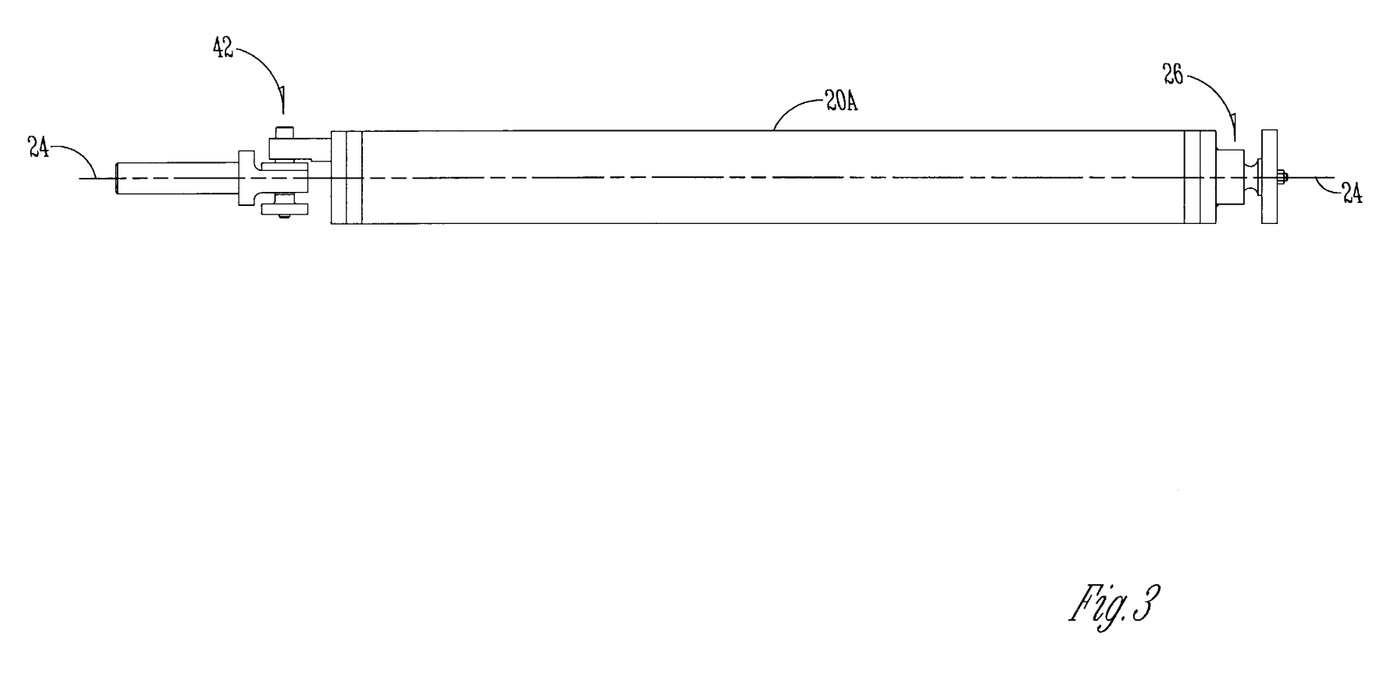
FIG. 3 is a front elevation view of the components from FIG. 2.

Referring to FIGS. 1–3, the headstock positioner arm 16A has a conventional motor and gearbox drive mechanism 22 mounted thereon, which rotates a fixture subframe 20A about an axis of rotation 24. The fixture subframe 20A includes a first end that drivingly connects by ball-and-socket means 26 to the drive mechanism on the headstock positioner arm 16A. The ball-and-socket means 26 preferably include a pair of spaced apart ball-receiving cylinders or sockets 28, 30 on the first end of the fixture subframe 20A. The mating balls 32, 34 are attached to a drive plate 36, which is in turn coupled to the drive mechanism 22. The sockets 28, 30 and balls 32,34 slidingly mate and are similar to those used for radial timing by Gold et al. in U.S. Pat. No. 4,713,873, except that each of the balls 32, 34 and cylinders 28, 30 have a respective central longitudinal axis 38, 40 that is parallel to the axis of rotation 24 of the fixture subframe 20A and disposed an equal distance therefrom. Thus, the space required to rotate the fixture 20A is substantially reduced.

Figure 6:
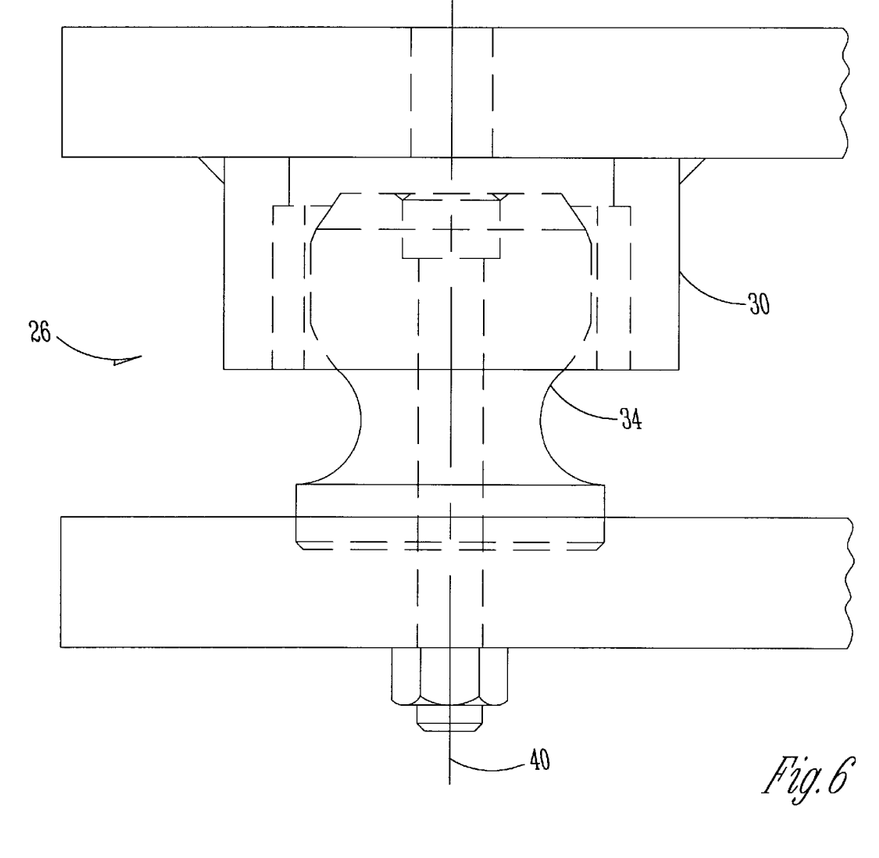
FIG. 6 is an enlarged view of the area 6—6 in FIG. 2 and shows the ball-and-socket connector that radially times the fixture subframe with respect to the rotary drive mechanism.

The balls 32, 34 resemble trailer hitch balls. The first ball 32 slidingly fits concentrically within the socket or receiving cylinder 28 to positively support the fixture subframe 20A. The ball 32 establishes a circular line of contact with the socket 28, thereby locating the subframe 20A along the axis of rotation 24 of the drive mechanism 22. The ball 34 radially times the fixture subframe 20A with respect to the axis of rotation 24 and the drive mechanism 22. The second ball 34 has two opposing poles (see FIG. 6) that are truncated to form two circular patches, which preferably extend perpendicular to the axis of rotation 24. The inside wall of the socket 30 protrudes inwardly at two opposing spots to slidingly mate with the two patches on the ball 34 and radially time the first end of the subframe 20A. The receiving cylinders 28, 30 are longer than the diameter of the balls 32, 34, which allows the subframe 20A to slide linearly along the axis of rotation 24 during installation and removal.

The second end of the fixture subframe 20A releasably and rotatably mounts to the tailstock positioner arm 18A via a ball joint coupling means 42. The coupling means 42 permits some angular misalignment of the subframe 20A in at least two directions from the axis of rotation 24. The fixture subframe 20A is securely supported for full rotation about the axis of rotation 24 and can also be rotated about an external axis 14 that is non-coaxial with the axis of rotation 24.

Figure 4:
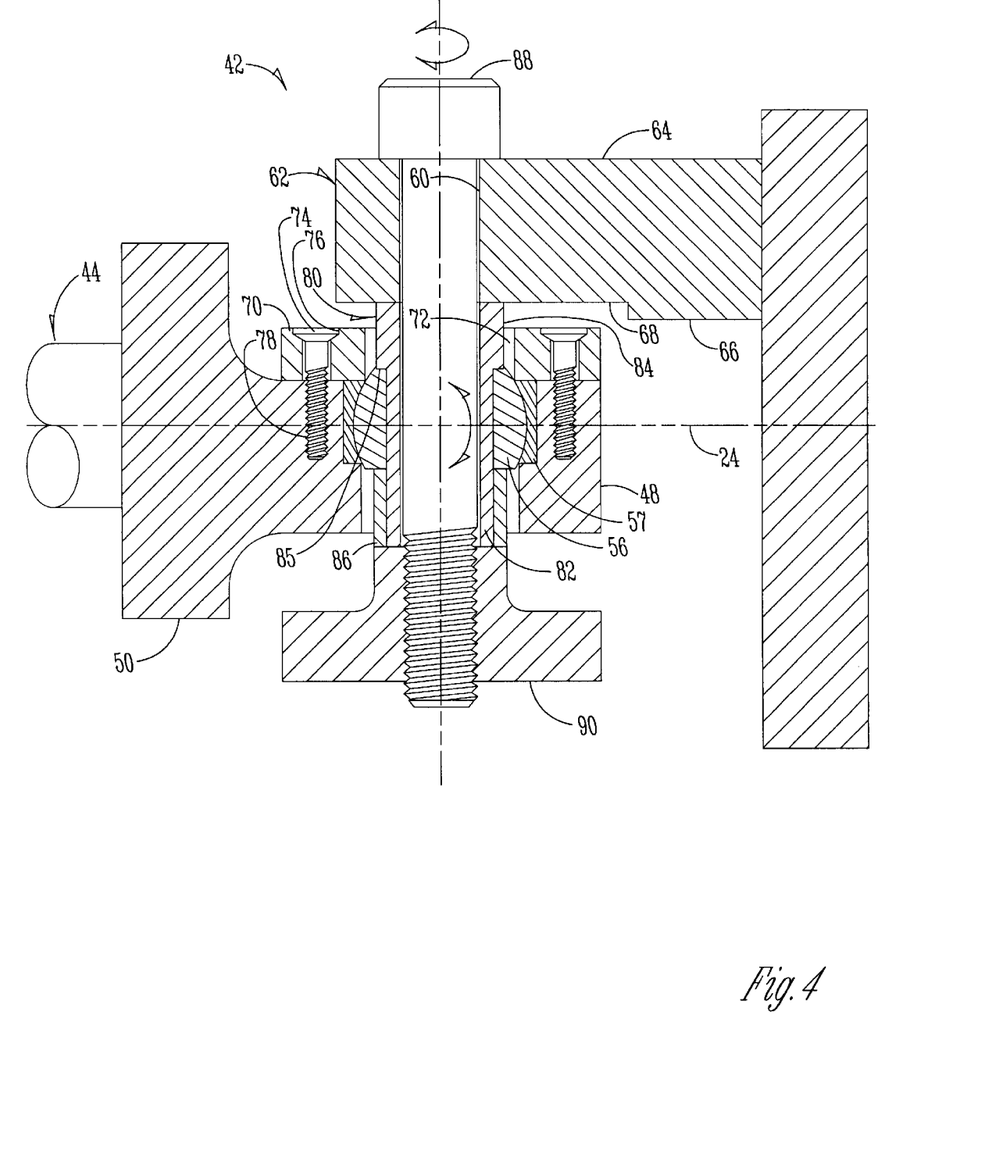
FIG. 4 is a vertical cross section of the ball joint coupling means of this invention taken along line 4—4 in FIG. 2.

The ball joint coupling means 42 includes a coupler shaft 44 that has a longitudinal axis, and first and second ends. The first end slidably and rotatably journals in a round bearing hole 46 formed by two pillow block bearings located on the tailstock positioner arm 18A. As best seen in FIG. 4, the second end of the shaft 44 is T-shaped and has a first longitudinal leg 48 parallel to the axis of rotation and a second leg 50 perpendicular to the first leg 48. The first leg 48 has a hole 52 with a counterbore 54 concentrically formed therearound. Both the hole 52 and the counterbore 54 extend perpendicular to the longitudinal axis of the shaft 44, which is coincidental with the axis of rotation 24. A bushing and ball assembly 55 includes a ball 56 and a bushing 57. The bushing 57 is pressed into the counterbore 54. The spherical ball 56, which has truncated upper and lower poles and a centrally located round hole 58 extending therethrough, is housed in the bushing 57 such that the round hole 58 is approximately coaxial with the counterbore 54 and the hole 52 in the coupler shaft 44.

A clearance hole 60 extends through a mounting flange 62 on the second end of the fixture subframe 20A. The mounting flange 62 has substantially parallel planar upper and lower surfaces 64, 66. An indented area 68 for clearance is provided in the lower surface 66.

The coupling means 42 further includes an annular disk 70 that has a centrally located aperture 72. The disk 70 attaches to the first leg 48 by a plurality of threaded fasteners 74 that extend through a corresponding plurality of counterbored or countersunk holes 76 and into holes 78 in the leg. The holes 78 are arranged in a bolt hole circle pattern that is centered on the common central axis of the hole 52 and the counterbore 54. The aperture 72 of the disk 70 is preferably smaller in diameter than the counterbore 54 and the ball 56. A slight bevel or radius at the lower edge of the aperture 72, where it contacts the ball 56, provides smoother movement and causes the ball to wear more evenly.

A tubular ball mount bushing 80 includes a main tube portion 82 that extends through the ball 56. The bushing 80 also has an enlarged head portion 84 that is disposed in the aperture 72 of the disk 70 when the coupling means 42 is assembled. A shoulder 85 on the bottom of the head portion 84 limits movement of the ball 56 in one direction. A tubular spacer member 86 is pressed onto the main tube portion 82 to limit the movement of the ball 56 in the other direction.

A threaded bolt 88 passes through the mounting flange 62, the bushing 80 with the ball 56 thereon, and the first leg 48 to engage a hand nut 90 and complete the formation of the ball joint coupling means 42. The coupling means arrangement provides limited pivotal movement in at least two directions with respect to the first axis of rotation. First, as indicated by the arrows in FIG. 4, the coupling means 42 allows the fixture subframe 20A to pivot up or down with respect to the coupler shaft 44 and the tailstock positioner arm 18A. Second, the fixture subframe 20A can pivot in a horizontal plane about the vertical axis of the bolt 88. Thus, the fixture subframe 20A is coupled with the tailstock positioner arm 18A in a manner that permits both a minor degree of misalignment and quick interchangeability of the fixture subframe. Some misalignment is tolerated between the hole and bearings therein on the tailstock positioner arm.

The quick change tooling system of this invention allows a measure of misalignment between the drive mechanism 22 on the headstock positioner arm 16A or 16B, the subframe 20A or 20B, and the round bearing hole 46 in the tailstock positioner arm 18A or 18B. Previously, such misalignment would have lead to premature gear box failures in the drive mechanism 22. Premature gear box failures can thus be eliminated with the use of the quick change tooling system of the present invention.

Referring to FIG. 1, an optional safety latch member 92 can be provided. The safety latch member 92 includes a latch 94 that is pivotally mounted to the coupler shaft 44 as shown so as to connect it to the second end of the fixture subframe 20A if connection at the removable pin or bolt 88 is lost unexpectedly. The upper portion of the latch 94 pivots toward the tailstock, which allows access to the coupling means for loading and unloading the entire fixture subframe. The user pivots the upper portion of the latch 94 to a vertical position encircling the coupling means when the fixture subframe is ready to be rotated.

In the present invention, the fixture is positively captured, and not held in place through the use of gravity. This allows the headstock and tailstock structure to be rotated with the fixture about an external axis such as on a Ferris wheel style positioner like shown in FIG. 5. The tooling is positively captured as it goes through the rotation in an inverted condition. The fixture subframe cannot disconnect from the gear box and tailstock coupling during rotation about an external axis. Furthermore, the present invention rearranges the ball-and-socket means that connect the fixture to the drive mechanism and thereby reduces the radius that is required to rotate the fixture.

The quick change tooling system of this invention provides quick and easy methods for removing and attaching and fixture subframes 20A, 20B to the main framework 12 of the work station 10. To remove a fixture subframe 20A, 20B from the framework 12, the user: 1) attaches a hoist to the fixture subframe; 2) turns the bolt 88 or hand nut 90 to disconnect the coupling means 42; and 3) lifts and swings the fixture subframe away from the headstock positioner arm 16A or 16B, making sure the balls 32, 34 are clear from the receiving cylinders 28, 30. To attach a fixture subframe 20A, 20B to the framework 12 the user: 1) attaches a hoist to the subframe; 2) swings the fixture subframe so that the balls 32, 34 on the headstock positioning arm 16A or 16B engage the receiving cylinders 28, 30 on the fixture subframe; 3) lowers the second end of the fixture subframe and attaches the ball joint coupling means 42 thereto; and 4) detaches the hoist from the fixture subframe.

Thus, it can be seen that the present invention at least accomplishes its stated objections.

The preferred embodiments of the present invention have been set forth in the drawings and specification, and although specific terms are employed, these are used in a generic or descriptive sense only and are not used for purposes of limitations. Changes in the form and proportion of parts, as well as in the substitution of equivalents, are contemplated as circumstances may suggest or render expedient without departing from the spirit and scope of the invention as further defined in the following claims.

What is claimed is:

1. A quick change fixture subframe mounting arrangement for a robotic work station including a rotatable main framework with a headstock positioner arm having drive means thereon rotatable about an axis of rotation, a tailstock positioner arm opposite the headstock positioner, and a fixture subframe having opposite first and second ends rotatably supported between the headstock positioner arm and the tailstock positioner arm respectively, the mounting arrangement comprising:

ball-and-socket means for drivingly connecting the first end of the fixture with the drive means on the headstock positioner arm;

a ball joint coupling means for releasably and rotatably mounting the second end of the fixture subframe to the tailstock positioner arm along the axis of rotation so as to permit pivoting of the fixture subframe with respect to the tailstock positioner arm in a horizontal plane and in a vertical plane;

the fixture subframe being securely supported for rotation about the axis of rotation and about an external axis that is non-coaxial with the axis of rotation without reliance on gravitational forces.

2. The fixture subframe mounting arrangement of claim 1 wherein the ball joint coupling means comprises a coupler shaft having a longitudinal axis, a first end slidably journaled in a hole on the tailstock positioner arm, and a second end having a hole with a counterbore concentrically formed therearound and extending perpendicular to the longitudinal axis of the shaft; a ball having a center and a centrally located round hole extending therethrough housed in the counterbore in the coupler shaft such that the round hole is coaxial with the counterbore in the coupler shaft and the center is on the axis of rotation; a removable pin extending through a clearance hole on a mounting flange on the second end of the fixture subframe, the ball, and the second end of the coupler shaft; and means for selectively engaging the pin to prevent removal thereof.

3. The fixture subframe mounting arrangement of claim 2 wherein the second end of the coupler shaft has a generally T-shaped flange thereon with a first leg extending longitudinally and a second leg perpendicular to the first leg, the first leg including opposite upper and lower surfaces, the hole in the coupler shaft extending through the first leg from the upper surface to the lower surface.

4. The fixture subframe mounting arrangement of claim 3 further comprising an annular disk detachably mounted to the upper surface of the first leg and having an aperture therethrough.

5. The fixture subframe mounting arrangement of claim 3 wherein the coupling means further comprises a tubular bushing that receives the pin and includes a main tube portion that extends through the ball and an enlarged head portion incapable of passing through the hole in the ball.

6. The fixture subframe mounting arrangement of claim 5 wherein the coupling means further comprises a tubular member pressed onto the tube portion of the bushing to hold the ball against the enlarged head.

7. The fixture subframe mounting arrangement of claim 5 wherein the enlarged head portion of the bushing has a height greater than the depth of the counterbore.

8. The fixture subframe mounting arrangement of claim 2 wherein the removable pin comprises a threaded bolt.

9. The fixture subframe mounting arrangement of claim 8 wherein the means for selectively engaging the threaded bolt is a hand nut.

10. The fixture subframe mounting arrangement of claim 5 wherein the ball has truncated upper and lower poles thereon which define upper and lower planar surfaces.

11. The fixture subframe mounting arrangement of claim 5 further comprising a safety latch member for connecting the second end of the fixture subframe and the ball joint coupling means together if connection at the removable pin is lost unexpectedly.

12. A robotic work station comprising:

a rotatable framework main including a headstock positioner arm having drive means thereon rotatable about an axis of rotation and a tailstock positioner arm opposite the headstock positioner;

a fixture subframe having opposite first and second ends rotatably supported between the headstock positioner arm and the tailstock positioner arm respectively, the first end of the fixture subframe being drivingly engaged by the drive means so as to rotate about a first axis of rotation second end releasably attached to a ball joint coupling means pivotally mounted on the tailstock positioner arm along said first axis of rotation for releasably attaching the second end of the fixture subframe to the tailstock positioner arm;

both the first end and the second end of the fixture subframe being positively restrained and positioned radially with respect to the first axis of rotation without reliance on gravitational forces.

13. The robotic work station of claim 12 wherein the coupling means is pivotal in at least two planes that extend through the axis of rotation.

14. The fixture subframe mounting arrangement of claim 12 wherein the ball-and-socket means includes a pair of spaced apart ball-receiving cylinders on the first end of the fixture subframe, each of the cylinders having a central longitudinal axis that is parallel to the axis of rotation and is located an equidistant therefrom.

15. The fixture subframe mounting arrangement of claim 14 wherein one of the ball-receiving cylinders has an inner diameter with a pair of opposing protrusions thereon and one of the hitch balls has a pair of opposing flat polar areas thereon that slidingly mate with the opposing protrusions of the inner diameter so as to radially time the fixture subframe with respect to the axis of rotation.

16. A quick change fixture subframe mounting arrangement for a robotic work station including a rotatable main framework with a headstock positioner arm having drive means thereon rotatable about an axis of rotation, a tailstock positioner arm opposite the headstock positioner, and a fixture subframe having opposite first and second ends rotatably supported between the headstock positioner arm and the tailstock positioner arm respectively, the mounting arrangement comprising:

ball-and-socket means for drivingly connecting the first end of the fixture with the drive means on the headstock positioner arm, the ball-and-socket means including a pair of spaced apart hitch balls on the drive means and a corresponding and mating pair of ball-receiving cylinders on the first end of the fixture subframe, each of the cylinders having a central longitudinal axis that is parallel to the axis of rotation and is located an equidistant therefrom; and coupling means for releasably and rotatably mounting the second end of the fixture subframe to the tailstock positioner arm along the axis of rotation.

17. The fixture subframe mounting arrangement of claim 16 wherein one of the ball-receiving cylinders has an inner diameter with a pair of opposing protrusions thereon and one of the hitch balls has a pair of opposing flat polar areas thereon that slidingly mate with the opposing protrusions of the inner diameter so as to radially time the fixture subframe with respect to the axis of rotation.

* * * * *